June 11, 1940.  W. S. MACDONALD  2,203,689
RECORDING AND CONTROL APPARATUS
Filed Aug. 26, 1937   2 Sheets-Sheet 1

INVENTOR
Waldron Shapleigh Macdonald
BY
Blair, Curtis, Dunne & Hayward
ATTORNEYS

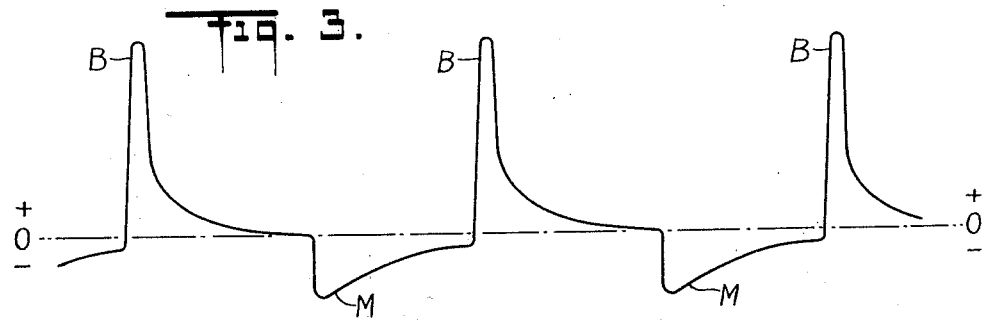
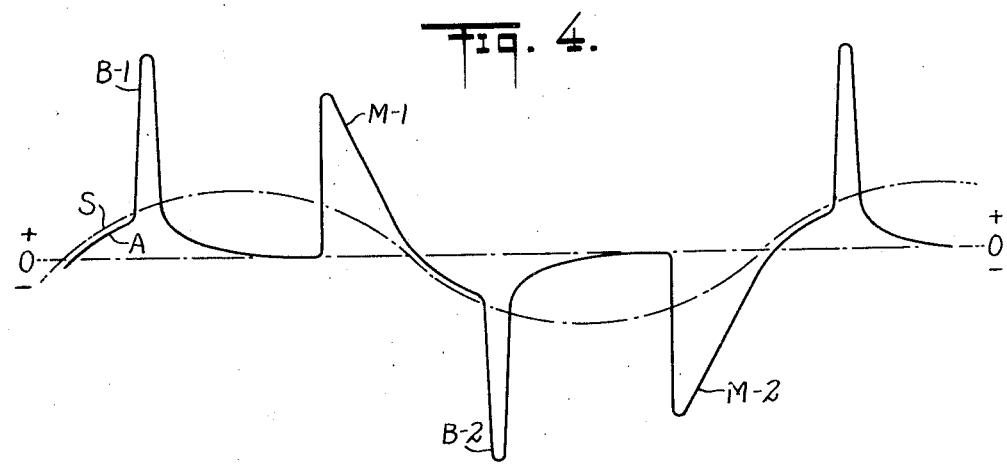
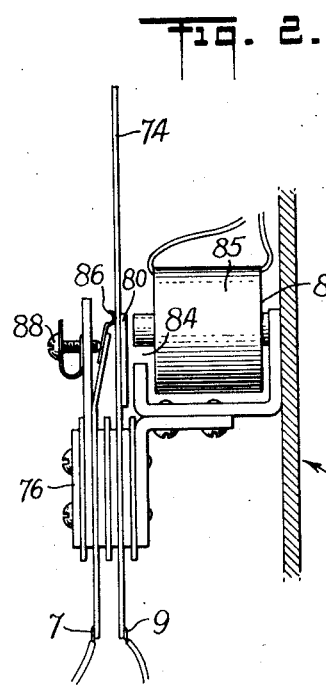
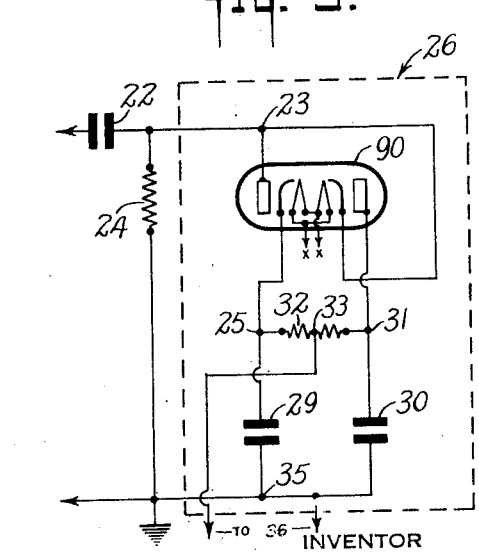

Patented June 11, 1940

2,203,689

UNITED STATES PATENT OFFICE 2,203,689

RECORDING AND CONTROL APPARATUS

Waldron Shapleigh Macdonald, Foxboro, Mass., assignor to The Foxboro Company, Foxboro, Mass., a corporation of Massachusetts Application August 26, 1937, Serial No. 161,067

24 Claims. (Cl. 172—239)

This invention relates to electrical apparatus responsive to small electrical characteristics or values, and more particularly to the method and apparatus for recording and/or controlling a condition measured by an element having a variable electrical characteristic by balancing an electrical circuit without using electro-mechanical translating mechanism. The present disclosure shows apparatus for recording and/or controlling the temperature of a furnace measured by a thermocouple by balancing a potentiometer circuit including the thermocouple without, however, employing the usual galvanometer. Thus the mechanical or electro-mechanical mechanism usually necessary for transmitting galvanometer positions to a balancing mechanism for balancing the potentiometer circuit is eliminated. Instead, small voltage components, arising from conditions of unbalance between the thermocouple and the potentiometer, actuate a reversible motor which moves a variable resistance in the potentiometer circuit to balance it.

To this end the unbalance components are amplified by apparatus whose effectiveness is independent of the absolute value of amplification obtained in the amplifier, and in which a predetermined standard value or a null point may be set which remains unchanged by variations of amplification, change of vacuum tubes, or extraneous influences such as line voltage variation, temperature variation, line surges or transients, pickup, etc.

It is an object of this invention to provide electrical means responsive to small electrical values derived from condition-sensitive means to operate condition recording and/or controlling apparatus.

This and other apparent objects and advantages are obtained by the means described in the following specification and may be more readily understood by reference to the accompanying drawings, in which:

Figure 2 illustrates diagrammatically an enlarged portion of the apparatus of Figure 1;

Figure 3 shows a wave form characteristic of an electrical value in a portion of the circuit of Figure 1 under conditions of electrical unbalance in the potentiometer circuit;

Figure 4 shows a wave form characteristic of the same electrical value shown in Figure 3 when the potentiometer circuit is balanced but is affected by a pick-up from an A. C. supply line; and Figure 5 is another embodiment of a portion of the circuit of Figure 1.

Figure 1:
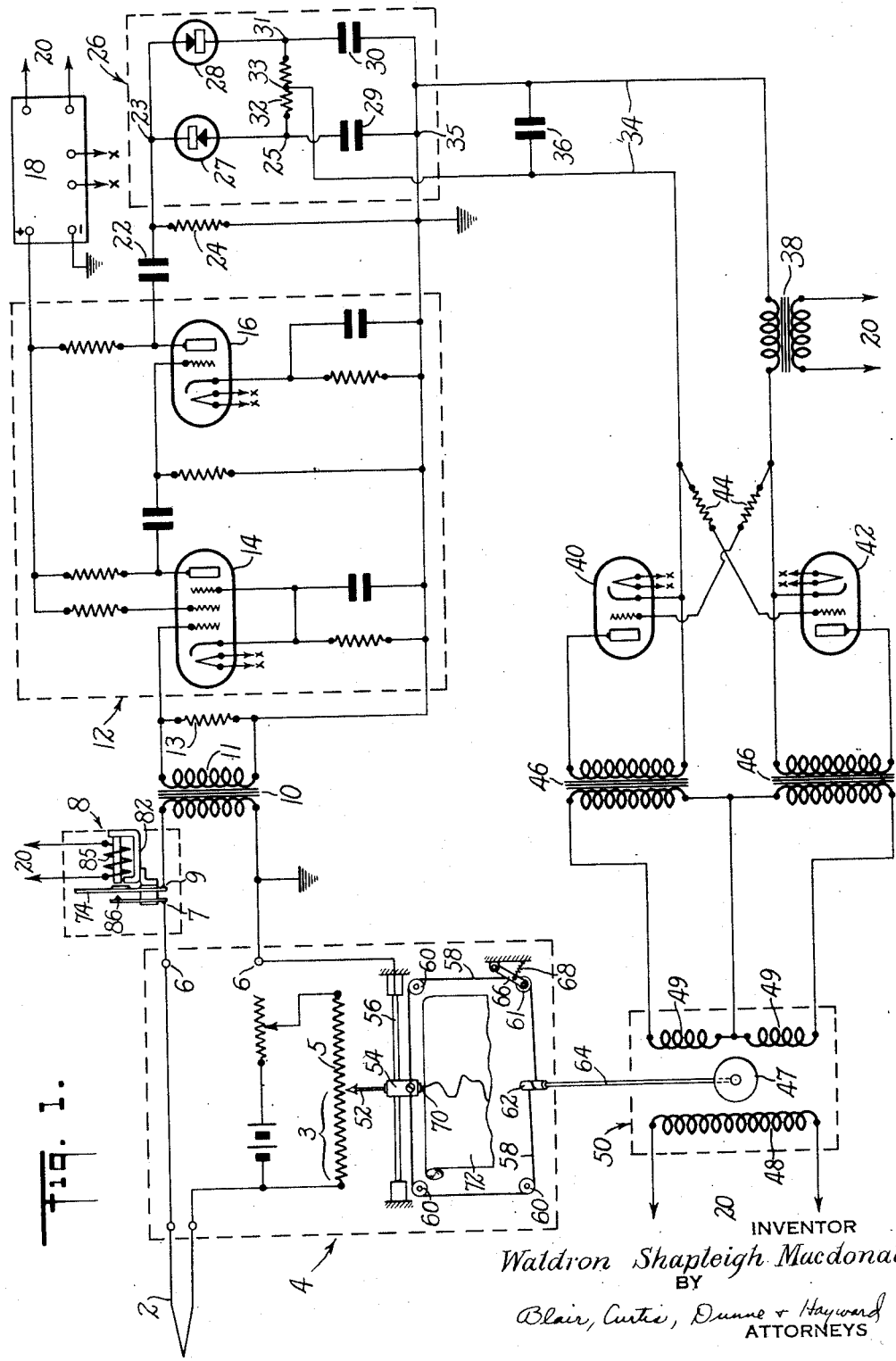
Figure 1 is a circuit diagram of a potentiometer recorder embodying the invention.

Referring to the upper left corner of Figure 1, a thermocouple 2, measuring the temperature of a condition such, for example, as a furnace, is connected to a potentiometer recording instrument, generally indicated as 4, in which the thermocouple E. M. F. is opposed to the E. M. F. across a portion of a potentiometer slidewire 5, in accordance with usual potentiometric practice. Whenever an unbalanced condition exists in this circuit, i. e., whenever the thermocouple E. M. F. is greater than or less than the E. M. F. across portion 3 of slidewire 5, a small D. C. potential is developed whose polarity and magnitude is dependent upon the direction and amount of the difference between the thermocouple and slidewire potentials. This small D. C. voltage, which hereinafter will be referred to as a differential potential, may be measured at terminals 6 of the instrument 4 which terminals, in a conventional recorder, would be connected to a galvanometer.

In the present invention, however, instead of transforming this differential potential into a mechanical position by means of a galvanometer, it is amplified electrically to an energy level sufficient to operate or control recording and/or controlling apparatus. This is accomplished by impressing this differential D. C. potential from terminals 6 across the primary of an iron-cored coupling transformer 10 and periodically interrupting the circuit thus formed by an interrupter, generally indicated at 8. The interruption of the current flowing in this circuit, due to the reactance of transformer 10, sets up transients in the primary winding which are induced in the secondary winding 11 of the transformer so that a distorted cyclic voltage is developed across the secondary terminals of the transformer. This cyclic voltage has unequal positive and negative maximum peak values in each cycle and is approximately proportional in magnitude to the magnitude of the differential D. C. potential at terminals 6 and has a maximum peak value in each cycle which is positive or negative, depending upon the polarity of the differential D. C. potential.

In order to produce a maximum transient effect, it is desirable that the transformer 10 have as high an inductive reactance as is practically commensurate with the circuit impedances required, the proper amplifier input impedance, and the desired amplification factor of the transformer. A damping resistance 13 is connected across the secondary winding 11 to rapidly suppress the transient oscillations so that the second peak of each transient is of much smaller magnitude than the first.

The secondary winding 11 of the transformer is connected to the input of an electronic tube amplifier, diagrammatically shown within the dotted lines 12. The amplifier 12 may be of any suitable type and in the embodiment shown is a two-stage resistance-coupled amplifier using a high-mu pentode vacuum tube 14 in the first stage and a low-mu triode vacuum tube 16 in the second stage. Referring to the upper right corner of the drawing, the plate and bias potentials for this amplifier may be supplied by any suitable power supply, such as unit 18 operating from a commercial A. C. supply line 20. This unit 18 may also be adapted to supply power for heating the cathodes of the vacuum tubes through the leads X—X.

A condenser 22 and a resistor 24 are connected in series across the output of the amplifier 12 so that the potential developed across the resistor 24 has a wave form approximately corresponding to the cyclic potential impressed on amplifier 12 from transformer 10, but is of increased magnitude. The potential developed across the resistor 24 is impressed across an "averaging" circuit (shown within dotted lines 26), which comprises two rectifiers 27 and 28 in series, respectively, with two condensers 29 and 30, and connected in parallel across resistor 24. The rectifiers 27 and 28 are so connected as to pass current in opposite directions. A resistor 32 joins a connection 25 between rectifier 27 and condenser 29 with a connection 31 between rectifier 28 and condenser 30. Thus a quadrilateral type circuit is formed with the rectifiers 27 and 28 forming two adjacent sides and the condensers 29 and 30 forming the other two sides. The potential from resistor 24 is applied to this circuit at the opposite terminals 23 and 35 common to the rectifiers and to the condensers, respectively, and resistor 32 is connected across the other two opposite terminals 25 and 31.

With this arrangement one of the rectifiers passes all of the positive portions of the cyclic voltage developed across resistor 24 and the other rectifier passes all of the negative portions of this potential so that potentials are developed across condensers 29 and 30 approximately proportional to the peak voltages of the positive and negative portions, respectively, of the cyclic potential. As the condensers 29 and 30 tend to discharge through resistor 32 a potential is developed between the common connection 35 between these two condensers and the mid-point 33 of resistor 32, which potential is an average of the positive and negative potentials of these condensers. This average potential is applied to a condenser 36 thus developing there-across a D. C. voltage corresponding in polarity and magnitude to the differential D. C. voltage at terminals 6 of the potentiometer instrument 4. When the polarity of this differential D. C. potential is reversed the positive and negative peak voltages in each cycle reverse in sign. This causes the charge on one of the condensers 29 and 30 to increase and the charge on the other to decrease and therefore the average potential across condenser 36 reverses in polarity thus corresponding in polarity to the differential D. C. potential at terminals 6.

The D. C. potential across condenser 36, in contrast with the differential D. C. potential at terminals 6, is of such character and magnitude that it may be used to control condition controlling and/or recording apparatus directly. Its zero or null value corresponds exactly with the zero or null condition of the potentiometer instrument 4, and it is relatively unaffected by variation of the absolute amplification of amplifier 12, variations in the potential of the supply line 20, electrical pick-ups of the type usually encountered, temperature change in the apparatus, etc.

In the present embodiment this control potential is used to control the direction and speed of rotation of a reversible motor, generally indicated at 50. This motor 50 is associated with the potentiometer-recorder instrument 4 to drive a slide-wire contact 52 along slide-wire 5 in the proper direction to reduce the differential potential across terminals 6 to zero and thus restore the potentiometer-thermocouple circuit to equilibrium.

The motor 50 may be any suitable type of reversible motor adapted to be controlled by a D. C. voltage of varying polarity and magnitude. In the present embodiment the motor 50 is a shaded pole motor operated from an A. C. supply line 20. Its speed and direction of rotation is controlled by varying the effectiveness of its shaded poles. This is accomplished by using the D. C. potential developed across condenser 36 to control the conductance and thus the effective impedance of two vacuum tubes 40 and 42 connected across the shaded poles.

Two shading pole coils 49 are wound on adjacent poles of the shaded pole motor 50 which has a "squirrel cage" type rotor 47 and a stator deriving an alternating flux from a field coil 48 connected to the A. C. supply line 20. A decrease in an impedance connected across one of the shading coils tends to shift the phase of the flux in that pole and thus cause an effective rotation of the magnetic field of the stator in one direction. A decrease in an impedance across the other shading coil has a reverse effect, effectively causing the field to rotate in the opposite direction. Thus the direction of rotation of the rotor, which rotates in the direction of the effective rotation of the magnetic field, depends on the direction of effective rotation of the resultant magnetic field developed by the main field coil 48 and the shading pole coils 49. When the impedance across each shading coil is equal the phase shift in the flux from the shaded poles is equal and opposite so that no effective rotation of the resultant magnetic field occurs and the rotor 47 remains stationary.

To control the conductance of the two vacuum tubes 40 and 42 and thus the impedance across the shaded pole coils 49, the D. C. control potential developed across condenser 36 is combined with A. C. potential obtained from supply line 20 through a transformer 38, which may be the same transformer used to heat the vacuum tube cathode, and is impressed through grid resistors 44 between the cathodes and grids of the two triodes 40 and 42 in an opposite sense so that as the grid of one of the triodes becomes more negative the grid of the other becomes more positive. As the anodes of these tubes are supplied with an A. C. potential through transformers 46 and motor 50 from supply line 20, the A. C. component in the grid circuits causes the grid potential to vary cyclically in synchronism with the anode potential. Thus the control effectiveness of the grids is dependent mainly upon the value of the D. C. control potential from condenser 36. This control of the grid potential of the two vacuum tubes correspondingly varies their effective electrical impedances. The anode-cathode circuits of the vacuum tubes are connected directly across the primaries of the two step-down transformers 46 so that the impedances of the tubes are reflected through these transformers to form effective impedances across the two shading pole coils 49.

The driving of slidewire contact 52 along slidewire 5 may be accomplished as shown schematically in Figure 1. Slidewire contact 52 is mounted on a carriage 54 which moves along one or more slidebars or tracks 56 parallel to the slidewire 5. A belt 58 is attached to the carriage 54 and passes over a plurality of pulleys 60 and around a driving drum 62 mounted on a shaft 64 attached to the rotor 47 of motor 50. One of the pulleys 61 is mounted on a lever 66 and is urged against the belt 58 by a spring 68 to hold the belt taut at all times. The carriage 54 may also carry a pen 70 coacting with a continuously moving record strip 72 to provide a record of the variations in the temperature measured by the thermocouple.

Either carriage 54, its associated parts, or motor 50 may operate control mechanism (not shown in the drawings), such, for example, as a valve, rheostat, switch, or the like (not shown) for controlling an agent influencing the condition being measured by the thermocouple 2, as, for example, in the arrangement shown in the U. S. Patent No. 1,356,804 to Brewer.

Briefly summarizing the operation of the apparatus illustrated in Figure 1, whenever the potentiometer circuit is unbalanced, as, for example, when a change occurs in the temperature being measured by the thermocouple 2 thus changing the thermocouple E. M. F., a differential D. C. voltage results at terminals 6. The polarity and magnitude of this voltage depends upon the direction and amount of the unbalance of the potentiometer circuit. This voltage is interrupted by the interrupter 8, amplified by amplifier 12, passed through the averaging circuit 26, and produces a D. C. potential across condenser 36 corresponding in polarity and magnitude to the potential developed at terminals 6. This D. C. potential controls the impedances of the vacuum tubes 40 and 42 and thus the impedances across the shading coils 49 of the motor 50 causing the impedance across one coil to increase and that across the other to decrease. This causes the rotor 47 to rotate in the proper direction to move the slidewire contact 52 along slidewire 5 to reduce the differential potential between the terminals 6.

The interrupter 8 is preferably so constructed that the "make" and "break" contact in the potentiometer circuit has no direct electrical connection with the power line which supplies the energy to operate the interrupter in order that pick-up from the power line may be kept at a minimum. Likewise it is desirable that the frequency of the interruption be other than the frequency of the power supply if an A. C. supply be used. An interrupter which has proven satisfactory for this purpose is illustrated in Figure 2. It comprises a vibrating metal reed 74 rigidly attached at one end to an insulated mounting block 76 and preferably of such length that its natural frequency of vibration is the desired interruption frequency. An armature 80 is mounted on the reed 74, preferably nearer the fixed end. This armature 80 is alternately attracted and released by an electro-magnet 82 provided with an air-gap 84 and so positioned with respect to the reed 74 that the air-gap 84 is opposite the armature 80. The electro-magnet 82 is energized by an exciter coil 85 connected to an A. C. supply line 20. When the supply line 20 is of the usual commercial 60 cycle frequency, it is apparent that the reed 74 will vibrate at 120 cycles per second. As it vibrates it alternately makes and breaks contact with a light spring contact 86 mounted on the support block 76. The distance of contact 86 from the normal position of reed 74 may be varied by an adjustment screw 88, thus varying the time between the "make" and "break." Contact spring 86 and reed 74 are connected in the circuit between the potentiometer circuit and transformer 10 through the terminals 7 and 9 as shown in Figure 1.

When the interrupter 8 makes and breaks the circuit from the potentiometer through transformer 10 the rapid rate of change of current flow in the primary of the transformer sets up transient oscillations due to the inductance and capacity of the transformer which oscillations are induced into the secondary of the transformer and develop a cyclic potential thereacross. This cyclic potential is amplified and impressed on the "averaging" circuit 26. Figure 3 shows a curve of the wave form such a cyclic potential may assume at the input to the "averaging" circuit under a representative condition. In this figure the pulse M is that caused by closing the circuit and the pulse B by breaking the circuit. When the polarity of the differential D. C. potential across the circuit being interrupted is reversed positive and negative peak voltages in each cycle reverse in sign, i. e., pulse B, which is shown as positive, moves across the zero axis 0—0 and becomes negative while pulse M reverses in a similar manner. The actual wave form of this cyclic potential depends, among other things, upon the speed of the interruption, the time between the "make" and "break," the magnitude of the differential D. C. potential, and the electrical characteristics of transformer 10.

It is preferable that these variables be so chosen that the "make" transient is suppressed as much as possible and the "break" transient is amplified. This effect is desirable because the magnitude of both the "make" and "break" transients increase proportionally to any increase in the differential D. C. potential at terminals 6 until the saturation point of the amplifier 12 is reached. When this occurs the peak E. M. F. impressed across the averaging circuit 26 due to the "break" transient remains substantially constant whereas the peak E. M. F. due to the "make" transient continues to increase with an increase in the differential D. C. potential until it reaches a value equal to that of the "break" transient. Under this condition the positive charge on one of the condensers 29 or 30 is substantially equal to the negative charge on the other condenser so that the resultant E. M. F. across condenser 36 is approximately zero although a considerable differential E. M. F. exists at the terminals 6. By proper design of the interrupter 8 and the transformer 10, taking into account the above mentioned factors, the "make" transient can be suppressed sufficiently so that this undesirable condition is reached only at some point outside of the usual operating range.

It is preferable, as above mentioned, to have the interrupter 8 operate at a frequency other than the frequency of the supply in order to nullify the effects of pick-up from the supply line.

Thus, when a 60 cycle supply frequency is used, an interruption frequency of 120 cycles per second has proved satisfactory in eliminating the disadvantageous effects of such pick-ups. This effect may be more readily understood by referring to Figure 4 which shows a typical wave form such as is impressed across the averaging circuit 26 when the potentiometer circuit is balanced, i. e. when there is no differential D. C. potential developed across terminals 6, but there is an A. C. current flowing through potentiometer 4, interrupter 8, and transformer 10 due to a pick-up from an A. C. supply line. This pick-up potential is represented by the broken line curve S in Figure 4. When it is interrupted by interrupter 8 a potential is developed across the secondary 11 of transformer 10, and thus across the averaging circuit 26, such as that shown by the solid curve A. It is apparent that a potential of this wave form will produce no resultant D. C. control E. M. F. across condenser 36 because the effect of the positive and negative portions of the wave are equal due to the fact that there are two equal and opposite "make" transients M—1 and M—2 and two equal and opposite "break" transients B—1 and B—2 in each cycle of the pick-up E. M. F. which transients nullify each other to give a zero resultant E. M. F. across condenser 36.

The rectifiers 27 and 28 may be any suitable type as, for example, vacuum tube rectifiers. An arrangement is shown in Figure 5 in which a double-diode vacuum tube 90, having two separate cathode-anode rectifier units in one envelope and a single cathode heater element for both its units, is substituted for the two single rectifier units 27 and 28 of Figure 1. The energy to heat the single cathode heater is obtained from the leads X—X of the power supply 18.

As many embodiments may be made in the above invention and as many changes may be made in the embodiment above described, it is to be understood that all matter hereinbefore set forth as shown in the accompanying drawings is to be interpreted as illustrative only and not in a limiting sense.

I claim:

1. Electrical control apparatus for controlling a condition, comprising, in combination, means responsive to the value of a condition for producing a D. C. potential varying in magnitude and direction from a base value with the amount and direction of the deviation of the value of the condition from a corresponding base value, means for transforming the D. C. potential into a cyclic potential having unequal positive and negative maximum peak values in each cycle and whose maximum peak voltage in each cycle varies in magnitude and polarity with said D. C. potential, means for averaging the peak values of said cyclic potential, and control means including means responsive to said average for producing a D. C. control potential for affecting said condition in an amount varying with the magnitude and polarity of said average.

2. Electrical control apparatus responsive to a condition, comprising, in combination, means responsive to the value of a condition for producing a D. C. potential varying in magnitude and direction from a base value with the amount and direction of the deviation of the condition from a base value, means for transforming this D. C. potential into a cyclic potential having unequal positive and negative maximum peak values in each cycle and whose maximum peak voltage in each cycle varies in magnitude and polarity with said D. C. potential, and control means including means effectively responsive to the peak values only of said cyclic potential for producing control effort varying in amount and direction with the magnitude and polarity of said maximum peak voltage values.

3. Electrical control apparatus responsive to a condition, comprising, in combination, means variable in electrical characteristic with the value of a condition, means for deriving from said variable means a cyclic electrical value having unequal positive and negative maximum peak values in each cycle and whose maximum peak value in each cycle varies in magnitude and polarity with the amount and direction of deviation of the condition from a predetermined value, and control means including means effectively responsive to the peak values only of said electrical value for producing control effort varying in amount and direction with the magnitude and polarity of said maximum peak values.

4. Electrical control apparatus responsive to the value of a condition, comprising, in combination, an electrical condition-sensitive means, means for deriving from said electrical means a cyclic electrical value having unequal positive and negative maximum peak values in each cycle and whose maximum peak value in each cycle corresponds in polarity to the direction of deviation of the value of said condition from a predetermined value, and control means including means effectively responsive to the peak values only of said cyclic electrical value for producing control effort corresponding in direction to the polarity of said maximum peak values.

5. In indicating, controlling, and/or recording apparatus, in combination, a potentiometer circuit including a balancing resistance, means sensitive to the value of a condition for introducing a varying potential into said circuit in opposition to an adjustable potential of said potentiometer, means responsive to unbalance of said potentials for developing a cyclic electrical potential having unequal positive and negative maximum peak values in each cycle and whose maximum peak value in each cycle varies with said unbalance, means for amplifying and averaging the peak values of said cyclic potential to produce a D. C. potential varying with said average, a reversible motor, a source of power for operating said motor, means controlled by said D. C. potential for controlling the application of said power to said motor, and driving means operated by said motor for adjusting said balancing resistance to adjust said adjustable potential in a direction tending to balance said potentiometer circuit.

6. In indicating, controlling, and/or recording apparatus, in combination, a potentiometer circuit including a balancing resistance, means in said circuit sensitive to the value of a process for introducing a varying potential into said circuit in opposition to an adjustable potential of said potentiometer, means responsive to unbalance of said potentials for developing a cyclic electrical value having unequal positive and negative maximum peak values in each cycle and whose maximum peak value in each cycle varies with said unbalance, and balancing means effectively responsive to the maximum peak values only of the peak value of said cyclic electrical value for changing said balancing resistance to vary said adjustable potential to tend to restore said circuit to a balanced condition.

7. In indicating, controlling, and/or recording apparatus, in combination, an electrical circuit having opposing factors capable of being balanced, means in said circuit sensitive to a condition and having a variable electrical characteristic influencing one of said factors, means responsive to an unbalanced condition of said factors for developing a cyclic electrical value having unequal positive and negative maximum peak values in each cycle and whose maximum peak value in each cycle varies with said unbalance, and balancing a circuit effectively responsive to said maximum peak values only for initiating corrective changes in said electrical circuit in a direction tending to restore a balanced condition.

8. In indicating, controlling, and/or recording apparatus, in combination, an electrical circuit responsive to the value of a condition for producing a D. C. potential varying in magnitude and polarity with the amount and direction of the deviation of the condition from a predetermined value, means including the primary of a transformer across which said D. C. potential is impressed, an interrupter for interrupting said circuit to produce transients in said circuit whereby a cyclic potential is developed across the secondary of said transformer having unequal positive and negative maximum peak values in each cycle and whose maximum peak voltage in each cycle varies in magnitude and polarity with said D. C. potential, and indicating, controlling, and/or recording means including means effectively responsive only to the magnitude and polarity of said maximum peak voltage values.

9. In indicating, controlling and/or recording apparatus responsive to a condition, in combination, an electrical circuit proportionally responsive to the condition adapted to produce a D. C. potential varying in magnitude and polarity with the amount and direction of the deviation of the condition from a predetermined value, an inductance across which said D. C. potential is impressed, an interrupter connected in series with the said inductance and said D. C. potential for interrupting the circuit thus formed to set up transients in said circuit, means for rapidly damping said transients, means for deriving from said transients a cyclic potential having unequal positive and negative maximum peak values in each cycle and whose maximum peak voltage in each cycle varies in magnitude and polarity with said D. C. potential, and indicating, controlling, and/or recording means including means effectively responsive to said maximum peak voltage values only.

10. In indicating, controlling, and/or recording apparatus responsive to a condition, in combination, means responsive to a condition adapted to produce a D. C. potential varying in magnitude and polarity with the amount and direction of the deviation of the condition from a predetermined value, means including an interrupter and an inductance across which said D. C. potential is impressed for developing a cyclic potential having unequal positive and negative maximum peak values in each cycle and whose maximum peak voltage in each cycle varies in magnitude and polarity with said D. C. potential, means associated with said interrupter for varying the interval between the time when it makes the circuit and when it breaks the circuit whereby the shape of said cyclic potential may be altered, and indicating, controlling, and/or recording means including means responsive to the magnitude and polarity of said maximum peak voltage.

11. In indicating, recording, and/or controlling apparatus responsive to the value of a condition, in combination, means responsive to the value of a condition adapted to produce a D. C. potential varying in magnitude with the amount of the deviation of the condition from a predetermined value, means including a circuit comprising an interrupter and an inductance across which said D. C. potential is impressed, said interrupter making and breaking said circuit to develop a cyclic potential having unequal positive and negative maximum peak values in each cycle and whose maximum peak voltage in each cycle varies in magnitude with said D. C. potential, and indicating, controlling, and/or recording means including means effectively responsive only to the magnitude of said maximum peak voltage values.

12. In indicating, controlling, and/or recording apparatus, in combination, means proportionally responsive to the value of a condition for producing a D. C. potential varying in magnitude and polarity with the amount and direction of the deviation of the condition from a predetermined value, means for transforming this D. C. potential into a cyclic potential having unequal positive and negative maximum peak values in each cycle and whose maximum peak voltage in each cycle varies in magnitude and polarity with said D. C. potential, and indicating, controlling, and/or recording means including means effectively and proportionally responsive to the peak values only of said cyclic potential for producing efforts varying in amount and direction with the magnitude and polarity of said maximum peak voltage values.

13. In indicating, controlling, and/or recording apparatus responsive to a condition, in combination, means proportionally responsive to said condition, means for setting up a cyclic electrical value having unequal positive and negative maximum peak values in each cycle and whose maximum peak value in each cycle varies in magnitude and polarity with the amount and direction of deviation of said condition from a predetermined value, and indicating, controlling, and/or recording means including means effectively and proportionally responsive only to the magnitude and polarity of said maximum peak value in each cycle.

14. In indicating, controlling, and/or recording apparatus responsive to a condition, in combination, means responsive to said condition for producing a cyclic electrical value having unequal positive and negative maximum peak values in each cycle and whose maximum peak value in each cycle corresponds in polarity to the direction of deviation of said condition from a predetermined value, and indicating, controlling, and/or recording means including means effectively responsive to the polarity of said maximum peak value only.

15. In indicating, controlling, and/or recording apparatus responsive to a condition, in combination, means sensitive to said condition for producing a cyclic electrical value having unequal positive and negative maximum peak values in each cycle and whose maximum peak value in each cycle corresponds in polarity to the direction of the deviation of the condition from a predetermined value, means for averaging the peak values of said cyclic electrical value, and indicating, controlling, and/or recording means including means responsive to the polarity of said average.

16. In indicating, controlling, and/or recording apparatus responsive to a condition, in combination, means proportionally responsive to the condition for producing a cyclic electrical value having unequal positive and negative maximum peak values in each cycle and whose maximum peak value in each cycle varies in proportional magnitude and in polarity with the amount and direction of the deviation of the condition from a predetermined value, means for averaging the peak values of said cyclic electrical value, and indicating, controlling, and/or recording means including means proportionally responsive to the magnitude and polarity of said average.

17. In indicating, controlling, and/or recording apparatus responsive to a condition, in combination, means proportionally responsive to said condition for setting up a cyclic potential having unequal positive and negative maximum peak values in each cycle and whose maximum peak voltage in each cycle varies in magnitude and polarity with the amount and direction of the deviation of the condition from a predetermined value, means for averaging the peak values of said cyclic potential, a condenser charged to a potential and polarity varying with said average, and indicating, controlling, and/or recording means including means responsive to the charge on said condenser for producing efforts varying in amount and direction with the magnitude and polarity of said charge.

18. In indicating, controlling, and/or recording apparatus responsive to a condition, in combination, means responsive to the condition for setting up a cyclic potential having unequal positive and negative maximum peak values in each cycle and whose maximum peak voltage varies in magnitude and polarity with the amount and direction of the deviation of the value of said condition from a predetermined value, means for averaging the peak values of said cyclic potential comprising a first condenser, a second condenser, a third condenser, means for charging said first condenser to a potential varying with the positive peak values of said cyclic potential, means for charging said second condenser to a potential varying with the negative peak values of said cyclic potential, means for charging said third condenser to a potential and polarity proportional to the average charge of said first and second condensers, and indicating, controlling, and/or recording means including means responsive to the charge on said third condenser.

19. In indicating, controlling, and/or recording apparatus responsive to a condition, (such for example as a temperature value) in combination, means responsive to the condition for setting up a cyclic potential having unequal positive and negative maximum peak values in each cycle and whose maximum peak voltage varies in magnitude and polarity with the amount and direction of the deviation of the value of said condition from a predetermined value, means for averaging the peak values of said cyclic potential comprising a first condenser, a second condenser, a third condenser, first rectifier means connected in series with said first condenser across said cyclic potential whereby said first condenser is charged to a potential varying with the peak positive values of said cyclic potential, second rectifier means connected in reverse direction in series with said second condenser across said cyclic potential whereby said second condenser is charged to a potential varying with the peak negative values of said cycle potential, one side of said first and second condenser being connected together and the other side being connected through a resistor, said third condenser being connected from the common side of said first and second condenser to the midpoint of said resistor whereby said third condenser is charged to a polarity and potential proportional to the average charge on said first and second condensers, and indicating, controlling, and/or recording means including means responsive to the charge on said third condenser for producing efforts varying with said charge.

20. The method of converting the measurement of a condition into a D. C. potential varying in magnitude and direction from a base value with the amount and direction of the deviation of the condition from a base value, comprising the steps of, measuring the value of the condition, converting said measurement into a D. C. potential varying in magnitude and direction from a base value with the variation of the condition from its base value, transforming this D. C. potential into a cyclic potential having unequal positive and negative maximum peak values in each cycle and whose maximum peak voltage in each cycle varies in magnitude and polarity with said D. C. potential, and averaging the peak values of said cyclic potential to produce said first-named D. C. potential.

21. The method of converting the measurement of a condition into a D. C. potential varying in magnitude and direction from a base value with the amount and direction of the deviation of the condition from a base value, comprising the steps of, measuring the value of the condition, converting said measurement into a D. C. potential varying in magnitude and direction from a base value with the variation of the condition from its base value, transforming this D. C. potential into a cyclic potential having unequal positive and negative maximum peak values in each cycle and whose maximum peak voltage in each cycle varies in magnitude and polarity with said D. C. potential, charging a first condenser to a potential varying with the positive peak values of said cyclic potential, charging a second condenser to a potential varying with the negative peak values of said cyclic potential, and charging a third condenser to a potential and polarity proportional to the average charge of said first and second condensers to produce a D. C. potential across said third condenser varying in magnitude and polarity with the amount and direction of the deviation of the condition from its base value.

22. The method of converting the measurement of a condition into a D. C. potential varying in magnitude and direction from a base value with the amount and direction of the deviation of the condition from a base value, comprising the steps of, measuring the value of the condition, comparing said measured value with a base value, setting up a cyclic potential having unequal positive and negative maximum peak values in each cycle, regulating the maximum peak voltages in said cyclic potential to values proportional to the amount of the deviation of said measured value of said condition from said base value, giving the maximum peak voltage in each cycle of said cyclic potential a polarity dependent upon the direction of the deviation of said measured value of said condition from said base value, averaging the peak values of said cyclic potential, and setting up a D. C. potential proportional to and having the same polarity as said average.

23. The method of converting the measurement of a condition into a D. C. potential varying in magnitude and direction from a base value with the amount and direction of the deviation of the condition from a base value, comprising the steps of, measuring the value of the condition, comparing said measured value with a base value, setting up a cyclic potential having unequal positive and negative maximum peak values in each cycle, regulating the maximum peak voltages in said cyclic potential to values proportional to the amount of the deviation of said measured value of said condition from said base value, giving the maximum peak voltage in each cycle of said cyclic potential a polarity dependent upon the direction of the deviation of said measured value of said condition from said base value, averaging the peak values of said cyclic potential, setting up a D. C. potential proportional to and having the same polarity as said average, and setting the frequency of said cyclic potential to some multiple of the frequency of the predominant stray electrical fields in the vicinity whereby the value of said D. C. potential is relatively unaffected by said stray fields.

24. In indicating, controlling, and/or recording apparatus responsive to a condition, in combination, means responsive to the condition for setting up a cyclic potential having unequal positive and negative maximum peak values in each cycle and whose maximum peak voltage in each cycle varies in magnitude and polarity with the amount and direction of the deviation of the value of said condition from a predetermined value, means responsive to the peak values of said cyclic potential, comprising, first means responsive to the positive peak values of said cyclic potential, second means responsive to the negative peak values of said cyclic potential, averaging means for averaging the response of said first and second means, and indicating, controlling, and/or recording means including means responsive to said averaging means.

WALDRON SHAPLEIGH MACDONALD.